March 23, 1937. N. W. NELSON 2,074,732
MANUFACTURE OF BRAKE LINING
Filed April 30, 1934 2 Sheets-Sheet 1
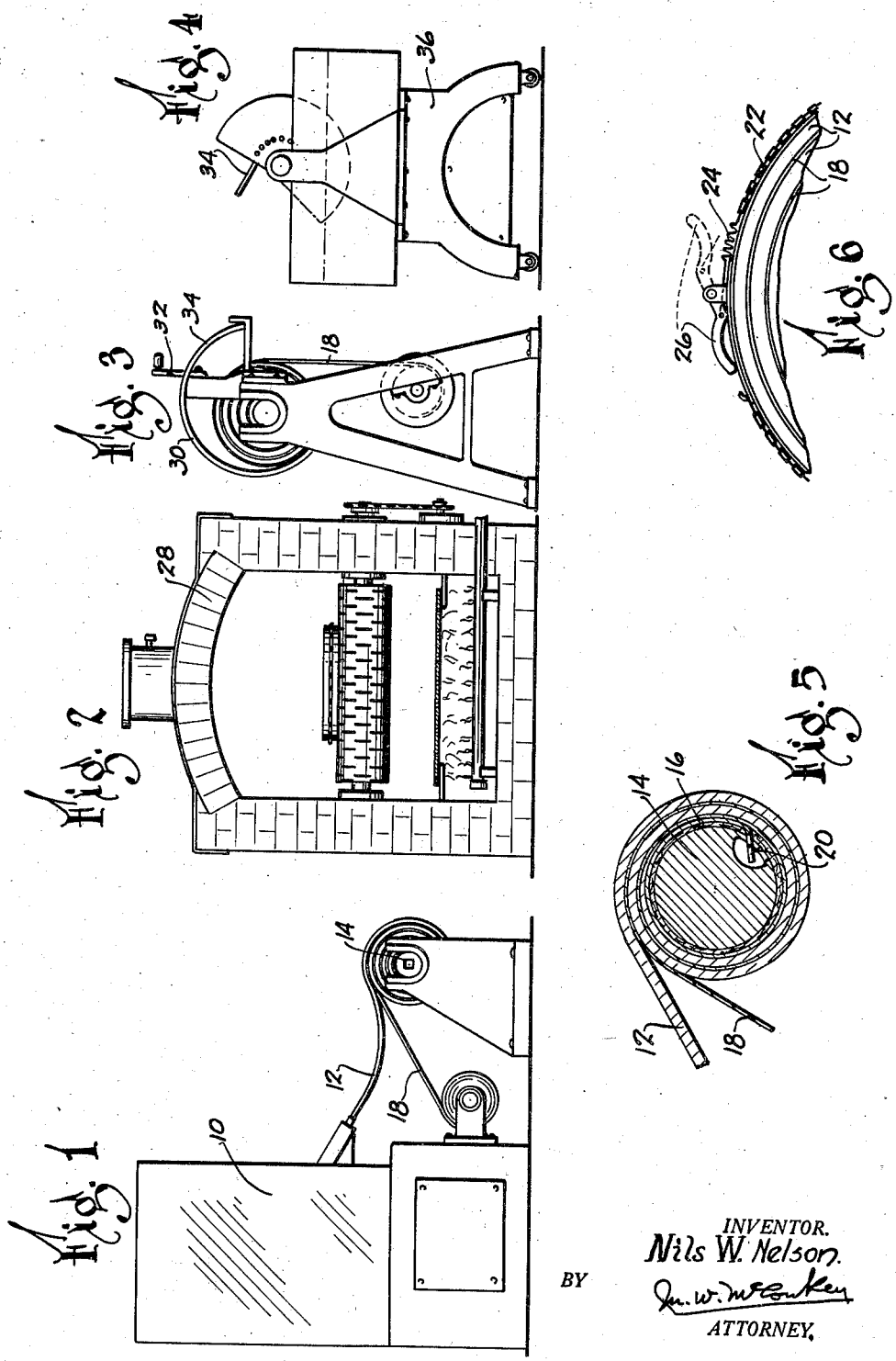
INVENTOR.
Nils W. Nelson.
BY
ATTORNEY.

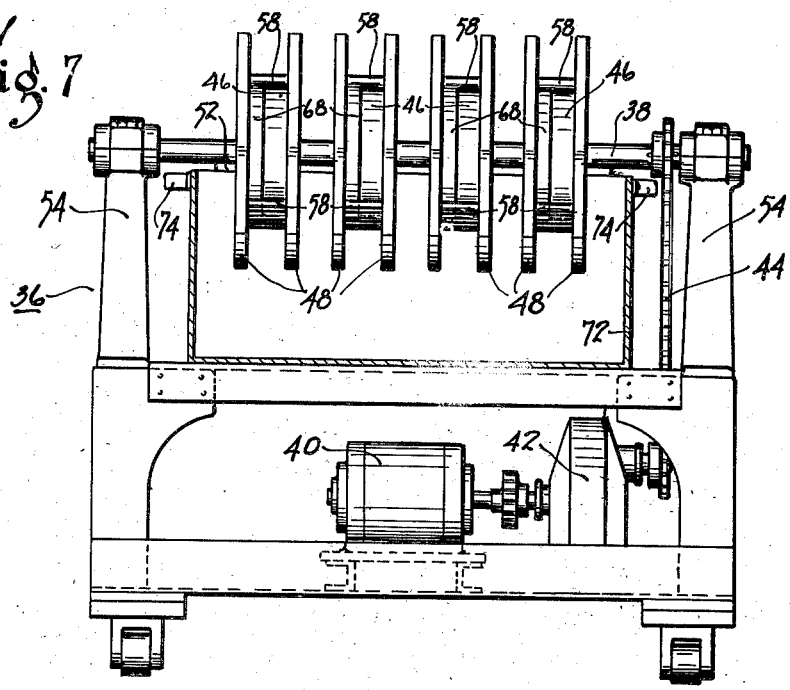
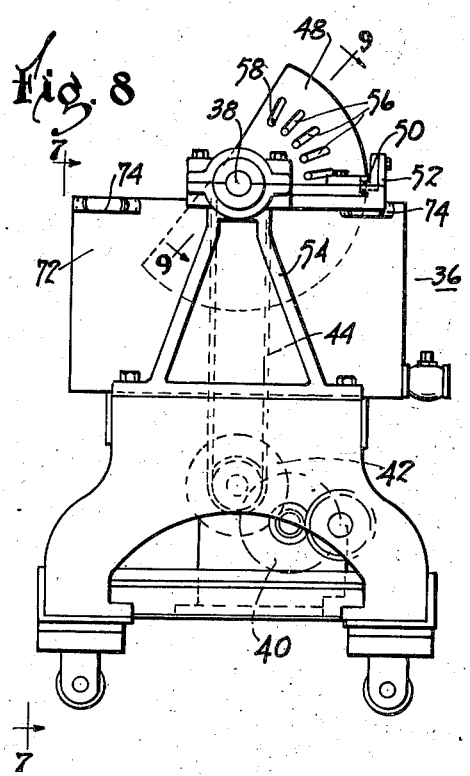
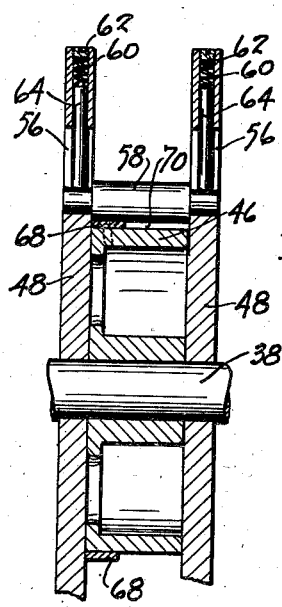

Patented Mar. 23, 1937

2,074,732

UNITED STATES PATENT OFFICE 2,074,732

MANUFACTURE OF BRAKE LINING

Nils W. Nelson, Troy, N. Y., assignor to Marshall Asbestos Corporation, Troy, N. Y., a corporation of Delaware Application April 30, 1934, Serial No. 723,037

20 Claims. (Cl. 18—6)

This invention relates to the manufacture of formed brake lining, known commercially as "molded" lining, and will be described as carried out in making formed lengths of extruded lining, for example a lining containing rubber and a sulphur compound and which is cured by vulcanization caused by heating and then, after forming, is set by cooling the curved lining while under pressure holding it in the desired shape.

In the particular sequence of steps illustrated in the drawings, the green lining is extruded under pressure in a long strip of approximately the desired width and thickness. The strip is then calendered by rolling under pressure to the desired size, and as it leaves the calendering machine, it is wound on a metal core or spool, while a steel or other metal band attached at one end to the spool is wound on at the same time, so that when the spool is ready for the curing oven the convolutions of steel and lining alternate.

Pressure is applied radially by suitable means, to prevent variations in thickness, which might otherwise be caused during curing, for example by the formation of blisters of the sulphur contained in the mix. While so held under radial pressure, but with the edges of the lining unrestricted and unobstructed, the loaded spool is heated for the necessary time (usually about one and a half hours) at a semi-vulcanizing temperature.

Usually I prefer at this stage to heat it to a temperature, e. g. 200° to 250° F., which only partly cures it but which is sufficiently high to insure that it will not thereafter "blister", the steel band serving three functions, viz.: (1) it holds the lining under sufficient pressure to insure that any blistering will act at the edges of the lining only, and will not cause variations in or otherwise affect its thickness; (2) it transmits the heat by conduction substantially uniformly across the entire width of the lining; and of course (3) it separates the successive convolutions of lining so that they cannot stick together.

When the lining is thus only partly cured by a first heating stage, it is next cut into lengths or segments suitable for attachment to brake shoes or bands, and these lengths are then heated until entirely cured, at a much higher temperature (e. g. 350°).

For running large quantities of lining of the same size, however, the segments may be cut after the calendering step, and trays containing the segments then run on a conveyor through an oven in which the two curing steps take place in sequence, the first part of the oven being around 200° to 250° F., and the last part at around 350° F.

According to an important feature of the invention, these lengths or segments while still hot and plastic (they remain hot enough and plastic enough to form as described below for about three minutes after leaving the oven) are run through a novel forming machine under pressure, to give them their final shape and particularly their curvature before they can set, and while they are still held under this forming pressure they are cooled to cause them to set in their final form. Thereafter they may be ground, formed with rivet holes, etc., in the usual way.

The machine which finally forms and sets the segments of lining in itself embodies substantial novelty. In the form shown in the drawings and which is a multiple machine (although of course the same principles apply in a single machine), there are a series of forming mandrels secured on a power-driven shaft and which have the same curvature as that desired for the formed lining.

Each mandrel has side members, shown journaled on and supported by the shaft but held from rotating therewith, and which carry a series of spring-pressed pressure rolls for forming the hot and slightly plastic lining against the mandrel and holding it there while it is carried through a bath of water or other cooling medium to set it permanently in the shape of the mandrel. Each mandrel may have means, preferably in the form of a set of interchangeable devices which are used for different widths of lining, and which confine the lining widthwise as it is rolled. However, the width and thickness are determined in the calendering step.

The above and other objects and features of the invention, including various novel combinations of parts and desirable particular constructions in the machine just described, will be apparent from the following description of the illustrative apparatus shown in the accompanying drawings, in which:

Figures 1 to 4 are diagrammatic views respectively of a calendering machine, an oven, a cutting device, and my novel forming and setting machine, arranged to illustrate the sequence of steps in my novel method of making brake lining;

Figure 5 is a section through one of the spools, showing the winding thereon of the extruded and sized strip of lining and the steel band;

Figure 6 is a partial section on a larger scale of a loaded spool, showing the pressure-applying means;

Figure 7 is a section on the line 7—7 of Figure 8, showing my novel forming and setting machine, in front elevation except for the water reservoir, which is in vertical section;

Figure 8 is an end elevation of this machine; and

Figure 9 is a partial section on the line 9—9 of Figure 8, showing the yielding mounting of the pressure rolls.

In making "molded" brake lining according to the illustrated method, a suitable "mix" or compound is extruded under pressure from a suitable extruding machine (not shown), of any usual or desired construction, in the form of a strip 12 of green (i. e. uncured) lining. The composition of the "mix" may follow any of the usual formulas, but preferably includes rubber or a rubber compound and sulphur or a sulphur compound, so that the lining may be cured by vulcanization.

The green strip of extruded material is then rolled under pressure to the desired width and thickness in a calendering machine 10, which may be of any desired construction. As explained above, the calendered lining 12 may next be wound on a steel core or spool 14, shown protected by a layer of asbestos material 16, together with a steel band or ribbon 18 attached at its end to the spool 14, for example by providing its end with an enlargement or bent portion 20 slipped axially of the spool into a slot or recess formed therein.

The steel band 18 serves the three functions of (1) separating the convolutions of uncured lining, (2) transmitting heat by conduction entirely across the width of the lining, and (3) holding the lining under radial pressure to prevent changes in thickness, caused for example by the "blistering" of the sulphur under heat. The radial pressure may be supplied by means such as an encircling chain 22 having at its end a spring or spring link 24, and tensioned by means such as a toggle-lever lock 26. The edges of the lining are unrestricted and unobstructed, to be acted on directly by the heat, and to permit the loss of excess sulphur, etc.

The loaded spool is then heated in a suitable oven or the like illustrated diagrammatically in Figure 2 at 28. The oven is illustrated as having a conveyor carrying the loaded spools therethrough, but such a conveyor is not an essential. Where, as is usually the case, it is desired to finish the lining in short curved lengths or segments suitable for mounting directly on brake shoes, I prefer to do the curing in two stages. First I heat it enough to effect a partial curing, carried far enough to eliminate free sulphur or other material which might "blister". For example, in this first stage it may be heated for one and a half hours at 200° to 250° Fahrenheit.

The partly-cured lining is then run through a cutting machine, illustrated diagrammatically at 30, where the knife 32 cuts it into short segments or lengths 34 corresponding to the brake shoes on which they are to be mounted.

These lengths 34 of lining, bent to approximately the desired curvature, are then put on trays carried by the conveyor back into the oven at a higher temperature (e. g. 350° F.) until completely cured.

In making very large runs of segments for immediate shipment, it is feasible to cut the lining into segments as it leaves the calendering machine, and to pass trays of the segments, bent approximately to the desired curvature, through an oven having two zones (e. g. at 250° and 350° F. respectively) to complete the curing in one trip through the oven. While the segments as so cured are of approximately the desired final curvature, preferably their radius at this time is slightly shorter than the final radius, so that the final forming is in the nature of an ironing down against a mandrel. While still plastic from the high temperature of the final curing, they are formed and set in the novel machine indicated at 36 in Figure 4, and shown in detail in Figures 7, 8, and 9.

In the form illustrated, this machine includes a shaft 38 shown driven by an electric motor 40 through reduction gearing 42 and a sprocket-chain drive 44. This shaft has keyed or otherwise secured thereto a series of rotatable mandrels 46, the diameter and curvature of which are the same as that desired for the finished lining sections.

Cooperating with each of the mandrels 46 is a pair of side members 48, which may be supported and journaled on the shaft 38, but which are prevented from turning therewith by means such as keys 50 projecting into notches in their periphery and carried by a bracket member 52 secured to and between the end supports 54 of the machine.

Each pair of side members 48 has a series of radial slots 56 receiving the reduced ends of pressure rolls 58. The rolls 58 are urged yieldingly toward the mandrels by means shown as springs 60 (Figure 9) adjustably held by threaded plugs or abutments 62, and acting on plungers 64 engaging the rolls 58 near their ends. If desired, the rolls 58 as well as the mandrels may be positively driven. The ends of the rolls may if desired be provided with babbitted bearings engaged by plungers 64.

The series of spring-pressed rolls 58 starts at the front of the machine, at such a position just back of the top of the mandrel 46 as makes it most convenient to insert the forward ends of the hot plastic lining sections between the mandrel and the first roll. Thereafter the power-driven mandrel draws the lining section lengthwise under the whole series of pressure rolls, ironing it against the mandrel and forming it accurately as to final shape and curvature.

The mandrels may if desired have pairs of semicircular edge abutments 68 screwed or otherwise secured thereto. The abutments 68, the rollers 58, the mandrel 46, and the righthand side member 48 (in Figure 9) define a space 70 of substantially the width and thickness of the lining.

While it is held pressed firmly against the mandrel, the lining is suddenly cooled and "set" by being carried through a bath of cold water or other cooling medium in a reservoir or tank 72. The tank 72 may have handles 74 at its ends, in order to be readily removable, and is kept filled with water to such a level as to immerse the bottoms of the mandrels 46 and the last half of the series of rolls 58.

The series of rolls 58 may conveniently be carried far enough around the corresponding mandrels 46 to insure that the mandrels will carry the lining sections up out of the cooling bath into the unobstructed space facing the operator (i. e., facing toward the left and slightly upward in Figure 8). The operator can remove these sections from, and supply hot plastic sections to be treated by the machine to, about five mandrels when the speed of shaft 38 is slow enough to insure accurate forming of the lining against the mandrels.

For linings of different widths, different ones of interchangeable sets of abutments 68 are used. For linings of different curvatures, different mandrels 46 are used.

There is no substantial change in the width or thickness of the lining during this final forming step, as the lining is at this time fully cured and hard, although for about three minutes after leaving the oven it is still hot enough to bend readily and accurately to the curvature of the mandrel, and of course when cooled it retains that curvature. Thereafter it is ground, formed with rivet holes, and packed for shipment.

While one illustrative machine, and one particular sequence of steps, have been described in detail, it is not my intention to limit the scope of my invention by that description, or otherwise than by the terms of the appended claims.

I claim:

1. That method of making formed brake lining which comprises extruding a strip of lining, winding the strip on a spool with metal between the successive convolutions, applying pressure radially to the spool and the strip wound thereon to prevent any increase of thickness while curing, curing said strip by heating to a vulcanizing temperature, cutting the strip into lengths, forming said lengths by rolling to size and shape while still retaining sufficient heat from the curing step to be plastic, and setting said lengths by cooling them while still held so formed.

2. That method of making formed brake lining which comprises winding a strip of uncured lining on a spool with metal between the successive convolutions, applying pressure radially to the spool and the strip wound thereon to prevent any increase of thickness while curing, curing said strip by heating to a vulcanizing temperature, cutting the strip into lengths, forming said lengths by rolling to size and shape while still retaining sufficient heat from the curing step to be plastic, and setting said lengths by cooling them while still held so formed.

3. That method of making formed brake lining which comprises winding a strip of uncured lining on a spool with metal between the successive convolutions, curing said strip by heating to a vulcanizing temperature, cutting the strip into lengths, forming said lengths by rolling to size and shape while still retaining sufficient heat from the curing step to be plastic, and setting said lengths by cooling them while still held so formed.

4. That method of making formed brake lining which comprises heating a piece of lining to a temperature high enough to cure it, forming it progressively from one end to the other under pressure while still hot enough from the curing step to be plastic, and cooling the lining progressively from one end to the other while it is held under forming pressure to set it rigidly in its final shape.

5. That method of making formed brake lining which comprises heating a strip of lining to a temperature high enough to cure it, cutting the strip into suitable lengths for facing brake shoes, forming these lengths progressively from one end to the other under pressure while still hot enough from the curing step to be plastic, and cooling said lengths progressively from one end to the other while they are held under forming pressure to set them rigidly in final shape.

6. That method of making formed brake lining which comprises heating and curing the lining, rolling a piece of hot cured lining to final curvature progressively from one end to the other, and cooling it progressively from said one end to the other as fast as it is so rolled and while it is held under pressure to set it in its formed size and shape.

7. That method of making formed brake lining which comprises heating and curing the lining, forming a piece of hot cured lining progressively from one end to the other, and cooling it progressively from said one end to the other as fast as it is so formed and while it is held under pressure to set it in its formed size and shape.

8. That method of making formed brake lining which comprises heating and curing the lining, forming a piece of lining progressively from one end to the other under pressure while hot enough to be plastic, and cooling it progressively from one end to the other to set it while it is still held under the forming pressure.

9. Lining manufacturing apparatus comprising means for forming a hot plastic piece of lining on a cylindrical curve progressively under pressure, and means for cooling and setting the lining so formed progressively while it is held under pressure by said first means.

10. Lining manufacturing apparatus comprising a mandrel and an arcuate series of pressure rolls for forming a hot plastic piece of lining progressively from one end to the other, and means for cooling and setting the lining so formed progressively while it is held under pressure against said mandrel by said pressure rolls.

11. Lining manufacturing apparatus comprising a coaxial series of power-driven rotatable mandrels having an outer curvature the same as that desired for the finished lining, a series of spring-pressed pressure rolls arranged in an arc about a substantial part of the periphery of each mandrel and adapted to roll a piece of hot plastic lining under pressure against said mandrel, side members on the mandrels for engaging the edges of the lining, and means for cooling the lining while it is held pressed against the mandrels by the last ones of the several series of rolls.

12. Lining manufacturing apparatus comprising a power-driven rotatable mandrel having an outer curvature the same as that desired for the finished lining, a series of spring-pressed pressure rolls arranged in an arc about a substantial part of the periphery of said mandrel and adapted to roll a piece of hot plastic lining under pressure against said mandrel, side members on the mandrels for engaging the edges of the lining, and means for cooling the lining while it is held pressed against the mandrel by the last ones of the rolls.

13. Lining manufacturing apparatus comprising a coaxial series of power-driven rotatable mandrels having an outer curvature the same as that desired for the finished lining, a series of spring-pressed pressure rolls arranged in an arc about a substantial part of the periphery of each mandrel and adapted to roll a piece of hot plastic lining under pressure against said mandrel, and means for cooling the lining while it is held pressed against the mandrels by the last ones of the several series of rolls.

14. Lining manufacturing apparatus comprising a power-driven rotatable mandrel having an outer curvature the same as that desired for the finished lining, a series of spring-pressed pressure rolls arranged in an arc about a substantial part of the periphery of said mandrel and adapted to roll a piece of hot plastic lining under pressure against said mandrel, and means for cooling the lining while it is held pressed against the mandrel by the last ones of the rolls.

15. Lining manufacturing apparatus comprising a coaxial series of power-driven rotatable mandrels having an outer curvature the same as that desired for the finished lining, a series of spring-pressed pressure rolls arranged in an arc about a substantial part of the periphery of each mandrel and adapted to roll a piece of hot plastic lining under pressure against said mandrel, side members on the mandrels engaging the edges of the lining, and a tank for holding cooling liquid in which the lower parts of the mandrels and the last of the several series of rolls are immersed.

16. Lining manufacturing apparatus comprising a coaxial series of power-driven rotatable mandrels having an outer curvature the same as that desired for the finished lining, a series of spring-pressed pressure rolls arranged in an arc about a substantial part of the periphery of each mandrel and adapted to roll a piece of hot plastic lining under pressure against said mandrel, and a tank for holding cooling liquid in which the lower parts of the mandrels and the last of the several series of rolls are immersed.

17. Lining manufacturing apparatus comprising a power-driven rotatable mandrel having an outer curvature the same as that desired for the finished lining, a series of spring-pressed pressure rolls arranged in an arc about a substantial part of the periphery of said mandrel and adapted to roll a piece of hot plastic lining under pressure against said mandrel, side members on said mandrel engaging the edge of the lining, and a tank for holding cooling liquid in which the lower part of the mandrel and the last of the series of rolls are immersed.

18. Lining manufacturing apparatus comprising a power-driven rotatable mandrel having an outer curvature the same as that desired for the finished lining, a series of spring-pressed pressure rolls arranged in an arc about a substantial part of the periphery of said mandrel and adapted to roll a piece of hot plastic lining under pressure against said mandrel, and a tank for holding cooling liquid in which the lower part of the mandrel and the last of the series of rolls are immersed.

19. Lining manufacturing apparatus comprising a shaft having a mandrel secured thereto, side members journaled on the shaft, means for holding said members from turning with the shaft, and a series of pressure rolls having their ends mounted in the side members and yieldingly forced toward the mandrel.

20. That method of making formed brake lining which comprises extruding a strip of lining, winding the strip on a spool with metal between the successive convolutions, applying pressure radially on the spool and the strip wound thereon to prevent any increase of thickness while curing, partially curing said strip by heating at a semi-vulcanizing temperature, cutting the strip into lengths, completely curing said lengths by heating at a vulcanizing temperature, forming said lengths by rolling to size and shape while still retaining sufficient heat from the final curing step to be plastic, and setting said lengths by cooling them while still held so formed.

NILS W. NELSON.